(12) United States Patent
Santos Vega

(10) Patent No.: US 12,702,091 B2
(45) Date of Patent: Aug. 11, 2026

(54) CHEMICAL AGENT APPLICATION SYSTEM THAT IS REMOVABLY ATTACHABLE TO A LAWN MOWING TRACTOR

(71) Applicant: Adrian Santos Vega, Guayama, PR (US)

(72) Inventor: Adrian Santos Vega, Guayama, PR (US)

( * ) Notice: Subject to any disclaimer, the term of this patent is extended or adjusted under 35 U.S.C. 154(b) by 355 days.

(21) Appl. No.: 18/381,870

(22) Filed: Oct. 19, 2023

(65) Prior Publication Data

US 2025/0127089 A1 Apr. 24, 2025

(51) Int. Cl.

| | |
|---|---|
| ***A01D 43/14*** | (2006.01) |
| ***A01D 43/00*** | (2006.01) |
| ***A01D 101/00*** | (2006.01) |

(52) U.S. Cl.

CPC .............. *A01D 43/14* (2013.01); *A01D 43/00* (2013.01); *A01D 2101/00* (2013.01)

(58) Field of Classification Search

CPC .... A01D 43/14; A01D 2101/00; A01D 43/00; B05B 9/0403; B05B 12/002; B05B 15/62

See application file for complete search history.

(56) References Cited

U.S. PATENT DOCUMENTS

| | | | | |
|---|---|---|---|---|
| 5,195,308 | A * | 3/1993 | Grote | A01D 43/14 56/16.8 |
| 5,533,676 | A * | 7/1996 | Conley | A01D 43/14 239/289 |
| 6,808,126 | B1 * | 10/2004 | Dunlap | A01D 43/14 239/222.11 |
| 8,016,947 | B2 * | 9/2011 | Rushin | A01D 42/06 134/21 |
| 10,602,658 | B1 * | 3/2020 | Najpauer | A01C 23/007 |
| 11,324,165 | B2 * | 5/2022 | Rothrock | A01D 43/14 |
| 2005/0172597 | A1 * | 8/2005 | Lofton | A01D 43/14 56/16.8 |
| 2019/0110399 | A1 * | 4/2019 | St. Andre | A01D 43/14 |

* cited by examiner

*Primary Examiner* — Brad Harcourt

(74) *Attorney, Agent, or Firm* — Eugenio J. Torres-Oyola; Victor M. Rodriguez-Reyes; Rafael Rodriguez-Muriel

(57) ABSTRACT

A chemical agent application system that is removably attachable to a lawn mowing tractor, in which the chemical agent application system includes a chemical agent tank secured to and adapted to fit in a footrest section of a lawn mowing tractor, a suction pump, a suction hose, and a spray gun comprising a trigger, in which the suction pump is attached to the first chemical agent tank and is adapted to draw a chemical agent from the chemical agent tank, via the suction hose, and to direct the chemical agent towards the spray gun.

14 Claims, 7 Drawing Sheets

CHEMICAL AGENT APPLICATION SYSTEM THAT IS REMOVABLY ATTACHABLE TO A LAWN MOWING TRACTOR

FIELD OF THE DISCLOSURE

The present disclosure relates generally to a chemical agent application system that is removably attachable to a riding lawn mower or lawn mowing tractor.

BACKGROUND OF THE DISCLOSURE

Lawn maintenance is a time consuming and labor intensive task. This process typically requires cutting grass, which by itself takes up a lot of time, followed by the application of the particular chemical agent required by the lawn in question, which can double the time it takes to complete the lawn maintenance process, even if a riding lawn mower or lawn mowing tractor is used. Moreover, existing lawn mowing tractors with integrated chemical dispersion systems typically include chemical agent tanks that tend to be bulky or that stand out from the design of the tractor, and in some cases even obstruct the view of the operator of the lawn mowing tractor. In addition, existing chemical agent tanks tend to be fixed structures that are not portable and cannot be easily removed from the lawn mowing tractor.

Therefore, it is apparent that there is a need for a lawn maintenance tractor or apparatus that can be used to not only cut grass, but that is able to simultaneously apply a desired chemical agent to the grass, thereby reducing the time it takes to complete the lawn maintenance process. Moreover, there is a need for a chemical agent tank that looks aesthetically pleasing instead of being a bulky structure that stands out from the design of the lawn mowing tractor, hinders the operator's view, and takes up space that could be used for more useful purposes. Lastly, there is a need for a portable chemical agent tank that can easily be removed and installed from one tractor to another, thus making the lawn maintenance process more efficient.

SUMMARY OF THE DISCLOSURE

In one embodiment, the present disclosure relates to a chemical agent application system that is removably attachable to a lawn mowing tractor, comprising a chemical agent tank secured to and adapted to fit in a footrest section of a lawn mowing tractor; a suction pump, a suction hose, and a spray gun comprising a trigger; wherein the suction pump is attached to the first chemical agent tank and is adapted to draw a chemical agent from the chemical agent tank, via the suction hose, and to direct the chemical agent towards the spray gun; wherein the lawn mowing tractor comprises a vehicle frame having an upper area and a lower area, wherein the upper area has a higher elevation on the vehicle frame than the lower area; and wherein the footrest section is located on the lower area.

In another embodiment, the present disclosure relates to a lawn mowing tractor with an integrated chemical agent application system, comprising a vehicle frame having a front end, a rear end, a top face, and a bottom face; one or more wheels secured to the front end and one or more wheels secured to the rear end; an engine secured to the rear end of the vehicle frame; wherein the top face of the vehicle frame includes an upper area and a lower area, said upper area having a higher elevation than the lower area, and wherein the top face of vehicle frame comprises a step between the upper area and the lower area; one or more steering levers or joysticks adapted to steer or maneuver the lawn mowing tractor; a blade assembly secured to the bottom face of the vehicle frame, said blade assembly comprising a set of cutting rotating blades disposed within a housing guard; a battery; a seat secured to the upper area on the top face of the vehicle frame; a receptacle located beneath the seat that is adapted to house the battery; a gas tank located on the upper area on the top face of the vehicle frame; a first chemical agent tank secured to and adapted to fit in the lower area on the top face of the vehicle frame; a suction pump, a suction hose, and a spray gun comprising a trigger; wherein the suction pump is attached to the first chemical agent tank and is adapted to draw a chemical agent from the first chemical agent tank, via the suction hose, and to direct the chemical agent towards the spray gun.

DETAILED DESCRIPTION OF THE DISCLOSURE

Figure 1:
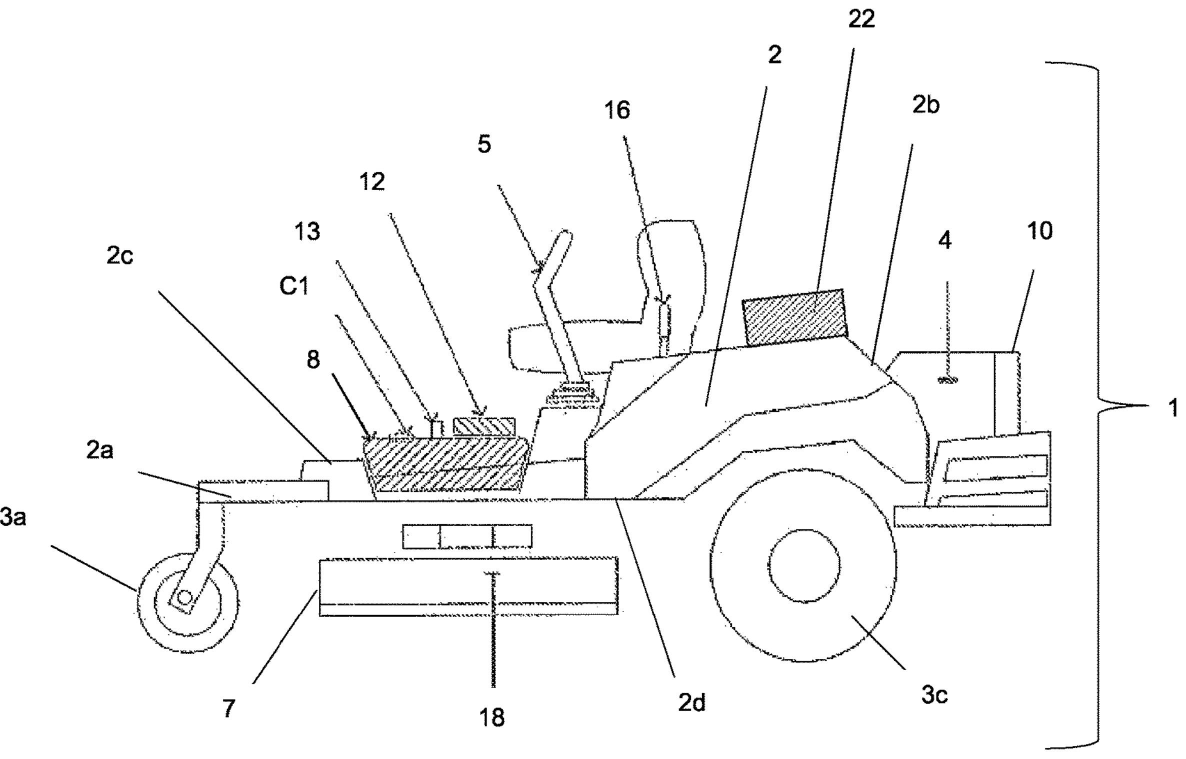
FIG. 1 shows a left-side view of a lawn mowing tractor with an integrated chemical agent application system, in accordance with the principles of the present disclosure.
Figure 2:
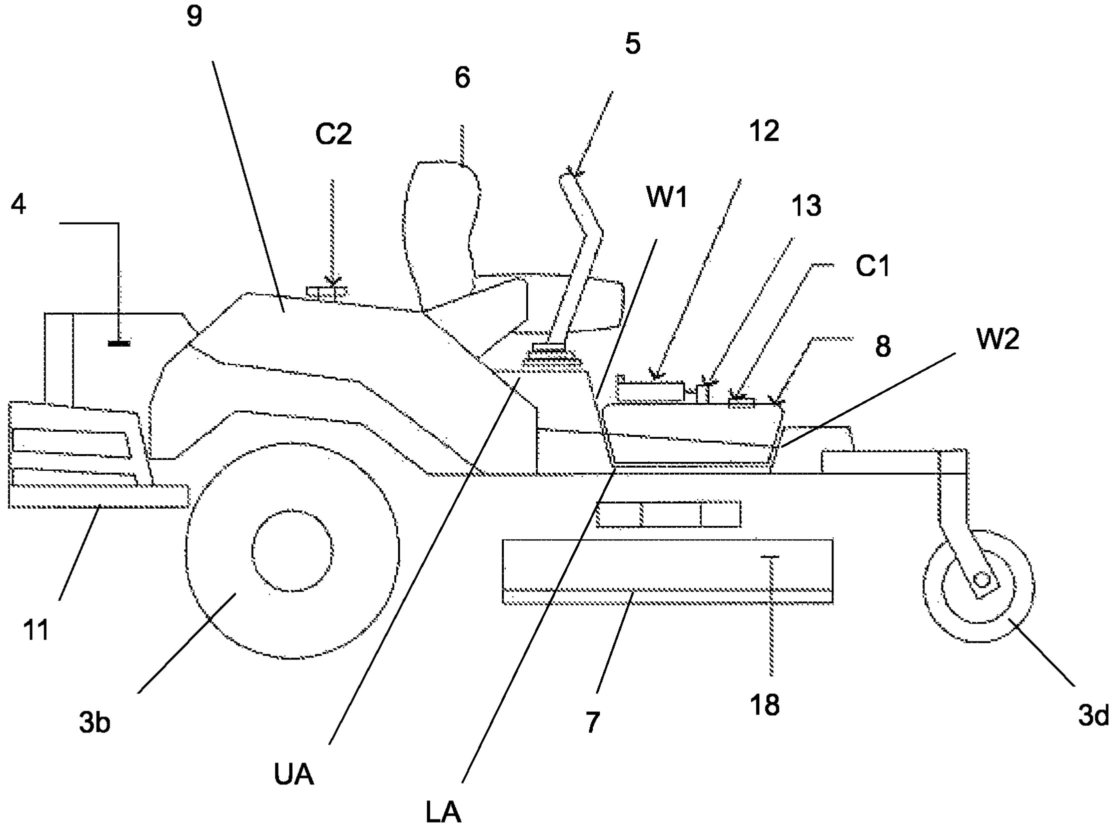
FIG. 2 shows a right-side view of the lawn mowing tractor with an integrated chemical agent application system, in accordance with the principles of the present disclosure.

As shown in FIGS. 1-7, the subject disclosure relates to a chemical agent application system that is removably attachable to a riding lawn mower or lawn mowing tractor 1, wherein said lawn mowing tractor comprises a vehicle frame 2 having a front end 2*a*, a rear end 2*b*, a top face 2*c*, and a bottom face 2*d*, wherein the vehicle frame 2 further comprises one or more wheels 3*a*, 3*b* secured to the front end 2*a* and one or more wheels 3*c*, 3*d*, secured to the rear end 2*b*. It should be noted that the lawn mowing tractor 1 should preferably be a zero-turn lawn mower; which refers to the type of riding lawn mower that achieves a turning radius that is effectively zero when the two drive wheels rotate in opposite direction. The lawn mowing tractor 1 further includes an engine 4 secured to the rear end 2*b* of the vehicle frame 2, said engine 4 being connected to an exhaust pipe. The engine 4 may be housed in a housing 10 secured to the rear end 2*b* of the vehicle frame 2. As shown in FIG. 2, the rear end 2*b* of the vehicle frame 2 may also include a cargo area 11 adapted to provide a cargo space to the lawn mowing tractor 1 or to act as a supporting base for the engine 4. Since the engine 4 is located in the rear end 2*b* of the vehicle frame 2, the front end 2*a* does not have any bulky structure obstructing the visibility of the user of the lawn mowing tractor 1. Therefore, such configuration of the lawn mowing tractor 1 makes it easier on the operator to look at the area directly in front of him and adjacent to the ground, thereby facilitating cutting, or spraying with a chemical agent, the lawn directly in front of the lawn mowing tractor with more precision. The term "chemical agent" includes, but is not limited to, fertilizers, herbicides, bactericides, fungicides, insecticides, pesticides, fumigation substances, any other chemical agent or substance designed for lawn maintenance, or any combination thereof. It should be noted that the top face 2*c* of the vehicle frame 2 further includes an upper area UA and a lower area LA, said upper area UA having a higher elevation than the lower area LA, thereby creating a step between the upper area UA and the lower area LA. Moreover, the lower LA area comprises a footrest section FR which, as explained below, is adapted to receive and fit the chemical agent tank 8.

Figure 3:
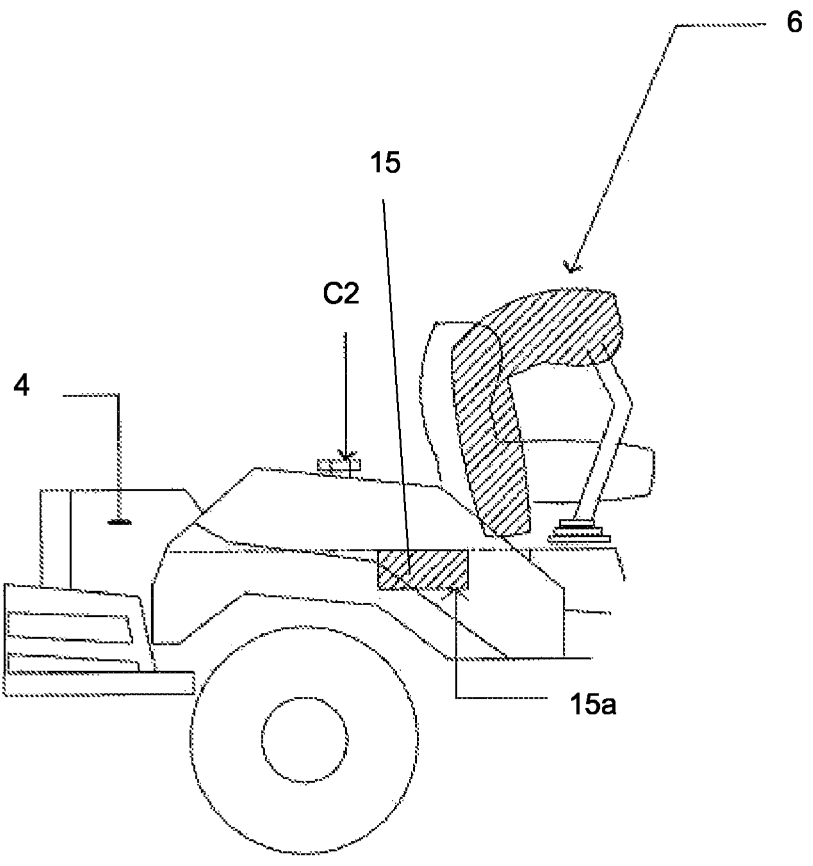
FIG. 3 shows the seat component of the lawn mowing tractor with an integrated chemical agent application system, in accordance with the principles of the present disclosure.
Figure 5:
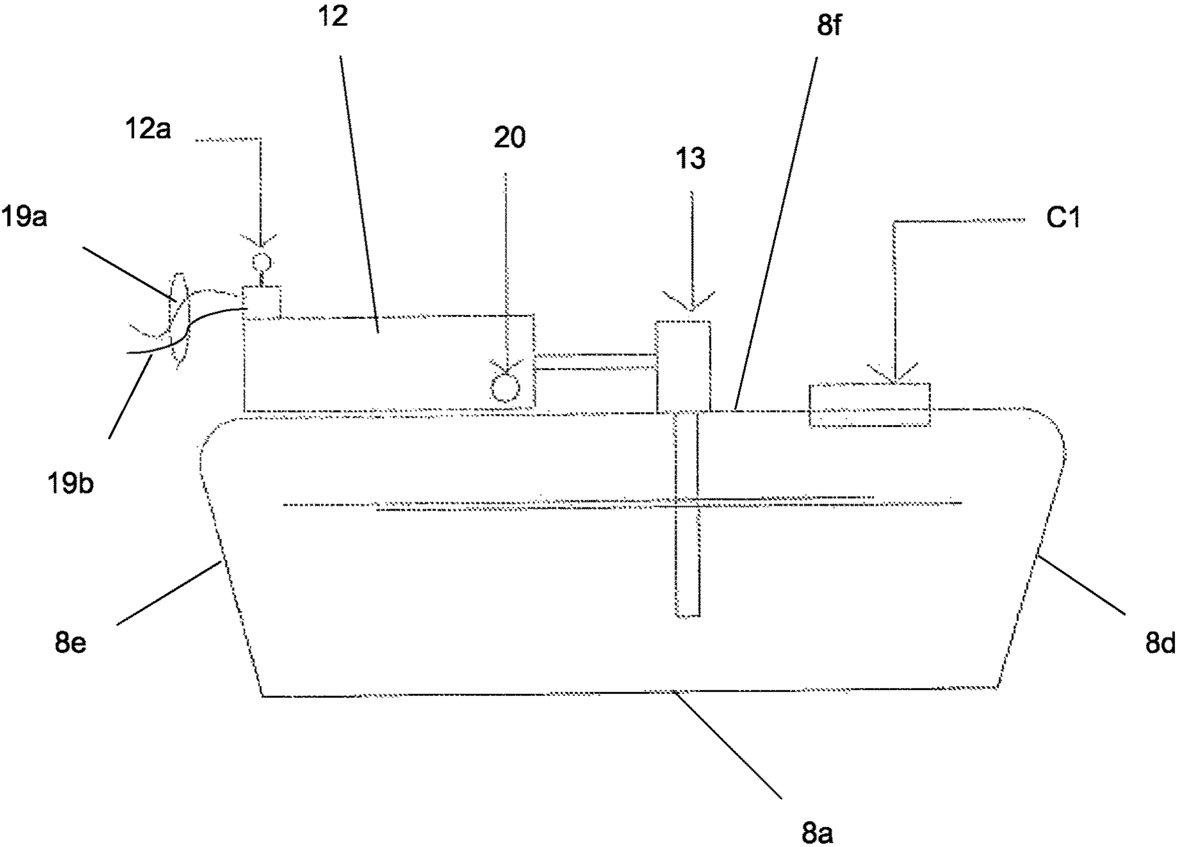
FIG. 5 shows the chemical agent tank component of the chemical agent application system, in accordance with the principles of the present disclosure.
Figure 7:
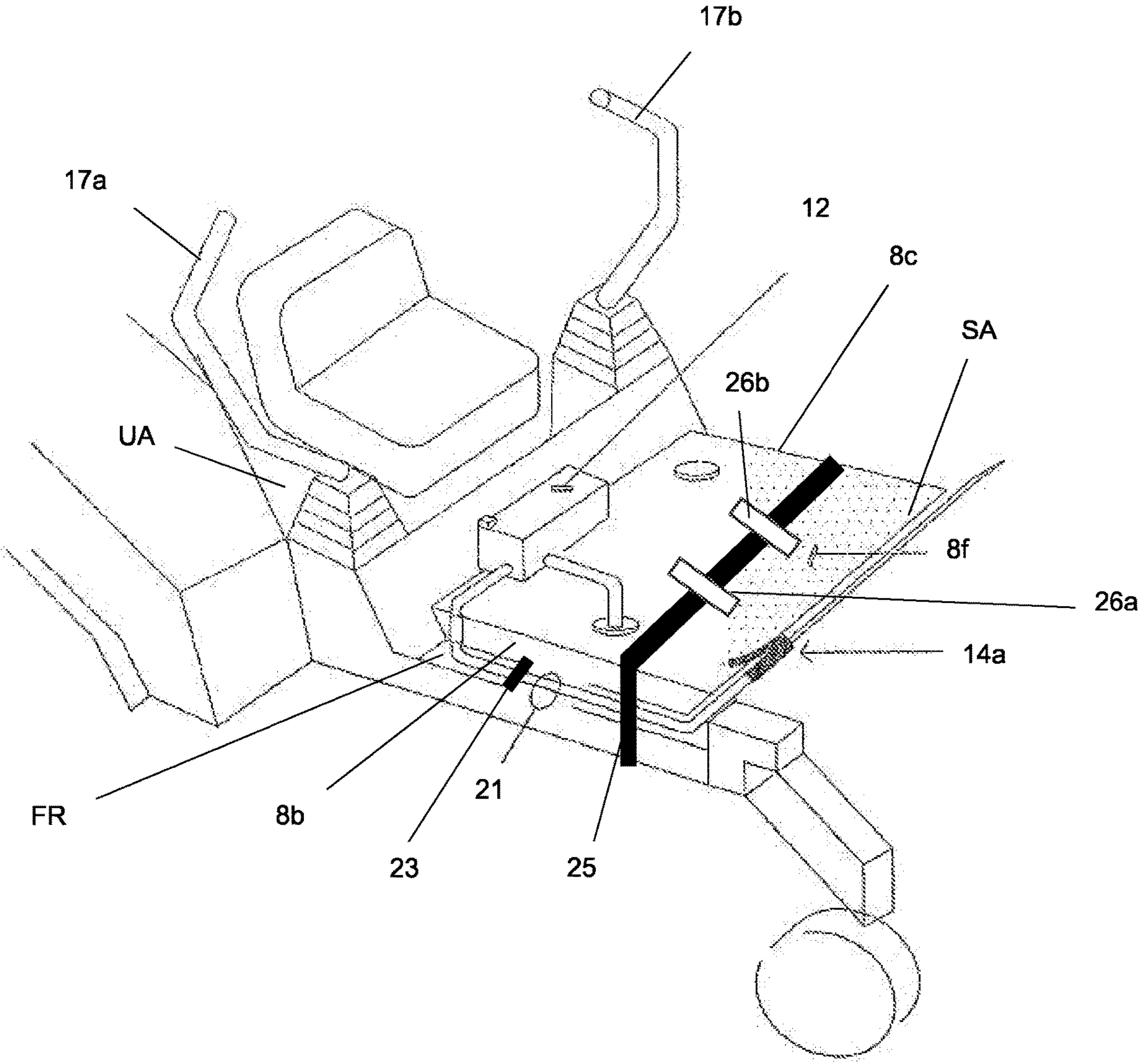
FIG. 7 shows a left-side perspective view of the lawn mowing tractor with an integrated chemical agent application system, in accordance with the principles of the present disclosure.

The lawn mowing tractor 1 further includes a seat 6 secured to the upper area UA on the top face 2*c* of the vehicle frame 2 that the operator of the tractor can use to sit upon while operating the lawn mowing tractor 1. Beneath the seat 6, the mowing tractor 1 includes a space or receptacle 15*a* with an interior volume adapted to house or store the battery 15. It should be noted that the seat 6 is pivotally connected to the upper area UA, which permits the seat 6 to be lifted, as shown in FIG. 3, so that the operator of the mowing tractor 1 can have access to the battery 15. The lawn mowing tractor 1 also includes a gas tank 9 on the upper area UA behind the seat 6; as well as a chemical agent tank 8 secured to and adapted to fit the lower area LA on the top face 2*c* of the vehicle frame 2, as shown in FIG. 2. As such, when the operator of the mowing tractor 1 is seated on the seat 6, the chemical agent tank 8 is located directly beneath the operator's feet. The chemical agent tank 8 preferably includes a bottom panel 8*a*, a first sidewall 8*b*, a second sidewall 8*c*, a front panel 8*d*, a rear panel 8*e*, and a top panel 8*f* interconnected to each other to form an interior volume, as shown in FIGS. 5 and 7. Particularly, the first sidewall 8*b* and second sidewall 8*c* of the chemical agent tank 8 are opposite to each other and connect the lateral ends of the bottom panel 8*a* to the lateral ends the top panel 8*f*; and wherein the rear panel 8*e* and front panel 8*d* are opposite to each other and therefore connect the front end of the bottom panel 8*a* to front end of the top panel 8*f*, and also connect the rear end of the bottom panel 8*a* to the rear end of the top panel 8*f*. Moreover, the front panel 8*d* and rear panel 8*e* of the chemical agent tank 8 are obliquely connected between the top panel 8*f* and the bottom panel 8*a*. In other words, the front panel 8*d* and rear panel 8*e* are slanted and pointing away from the bottom panel 8*a*. Such configuration increases the interior volume of the chemical agent tank 8 and simultaneously conforms to the shape of the lower area LA on the top face 2*c* of the vehicle frame 2.

Likewise, the shape of the lower area LA of the top face 2*c*, including the footrest section FR, conforms to the shape of the chemical agent tank 8. Specifically, the lower area LA of the top face 2*c* includes a first slanted wall W1 that conforms to the slanted shape of the rear panel 8*e*, a second slanted wall W2 that conforms to the slanted shape of the front panel 8*d*, and the foot rest section FR is adapted to receive and conform to the shape of the bottom panel 8*a*. Preferably, the first slanted wall W1 and the rear panel 8*e* of the chemical agent tank 8 have the same slanted angle; the second slanted wall W2 and the front panel 8*d* of the chemical agent tank 8 have the same slanted angle; and the bottom panel 8*a* and the footrest section FR are flat and run parallel to each other, in order to allow the lower area LA of the top face 2*c* to conform to the shape of the chemical agent tank 8. This configuration allows the chemical agent tank 8 to look aesthetically pleasing in as much as it gives the appearance or impression that the tank is part of the design of the vehicle frame, as opposed to being a bulky structure that stands out. Moreover, since the chemical agent tank 8 is removable, it can be easily installed on any other lawn mowing tractor having similar components to the one described herein.

It should be noted that the chemical agent tank 8 comprises a suction pump 12, preferably located on the top panel 8*f*, that is adapted to draw the chemical agent from the chemical agent tank 8, via a suction hose 13, and to direct it (i.e., the chemical agent) towards a spray gun or nozzle 14. Particularly, the suction hose 13 includes a first end and a second end, wherein the first end is attached to the suction pump 12 and the second end is attached to the chemical agent tank 8. The spray gun or nozzle 14, in turn, is attached, via a spray gun hose 21, to an attachment area 20 of the suction pump 12. As such, when the operator of the lawn mowing tractor 1 activates or turns on the suction pump 12, the pump 12 draws the chemical agent out from the chemical agent tank 8 towards the spray gun or nozzle 14, via the spray gun hose 21, which allows the operator of the mowing tractor to spray or apply the chemical agent in a desired area. The interaction between the suction pump 12, the chemical agent tank 8, the suction hose 13, the spray gun hose 21, and the spray gun or nozzle 14 represents the chemical agent application system disclosed in this disclosure. The suction pump 12, may also include a switch 12*a* adapted to turn the pump on or off. It should be noted that the chemical agent application system can work as a removably attachable component of a lawn mowing tractor; or on its own without the need of a lawn mowing tractor. The chemical agent tank 8 can be removably attached to the lower area LA of the vehicle frame 2 through different means. In one embodiment, the chemical agent tank 8 may be attached to the lower area LA of the vehicle frame 2 via an elastic belt or strap 25 adapted to tie up or secure the chemical agent tank 8 to the lower area LA of the vehicle frame 2. The elastic belt or strap 25 may be a ratchet strap or similar apparatus that facilitates tightening of the elastic belt or strap 25 but is also simple to disengage. The chemical agent tank 8 may also include one or more channels 26*a*, 26*b* (preferably on the top panel 8*f*) configured to receive and guide the elastic belt or strap 25 while tying up the chemical agent tank 8 to the lower area LA, thereby preventing any unwanted movement of the elastic belt or strap 25. Alternatively, the sidewalls of the chemical agent tank 8 may also include one or more openings that align with one or more openings on the lower area LA of the vehicle frame 2; wherein both sets of openings (i.e., the openings on the sidewalls and on the lower area) are adapted to receive one or more bolts or fasteners to secure the chemical agent tank 8 to the lower area LA of the vehicle frame 2.

Figure 4:
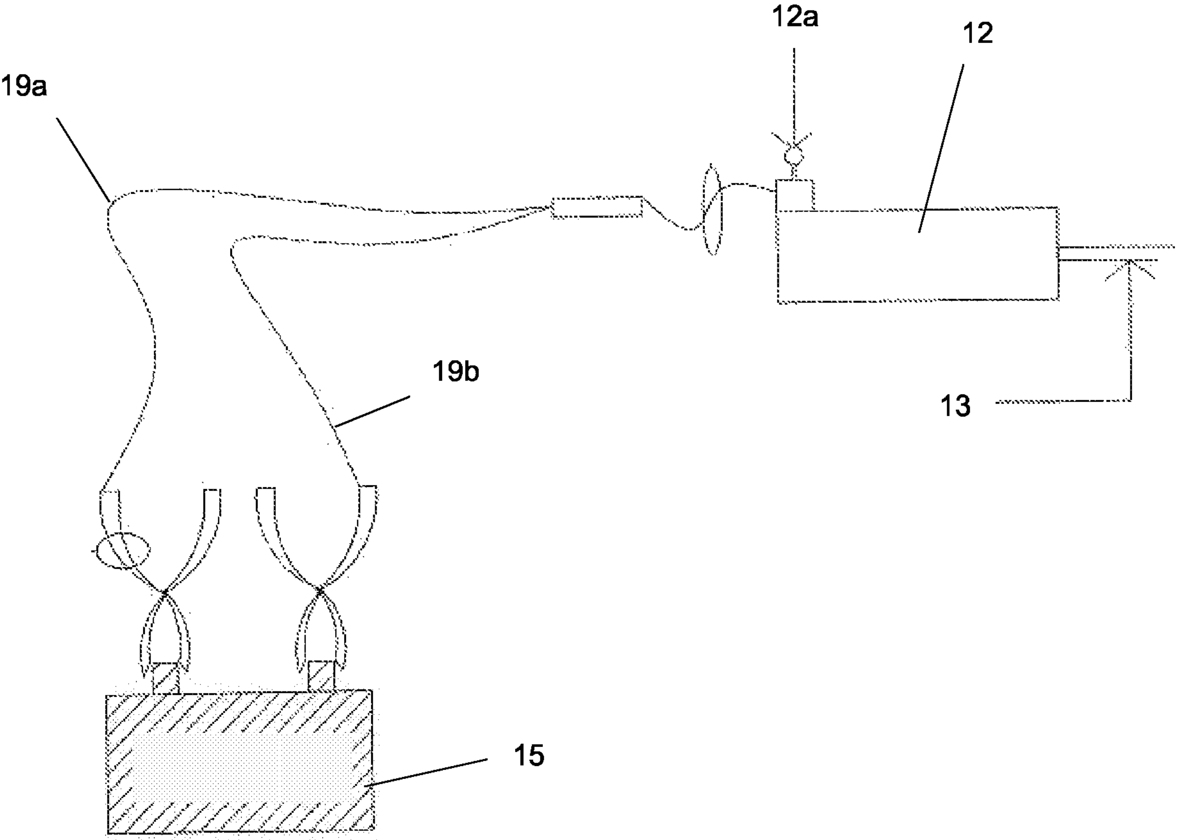
FIG. 4 shows the battery component and suction pump component of the chemical agent application system, in accordance with the principles of the present disclosure.
Figure 6:
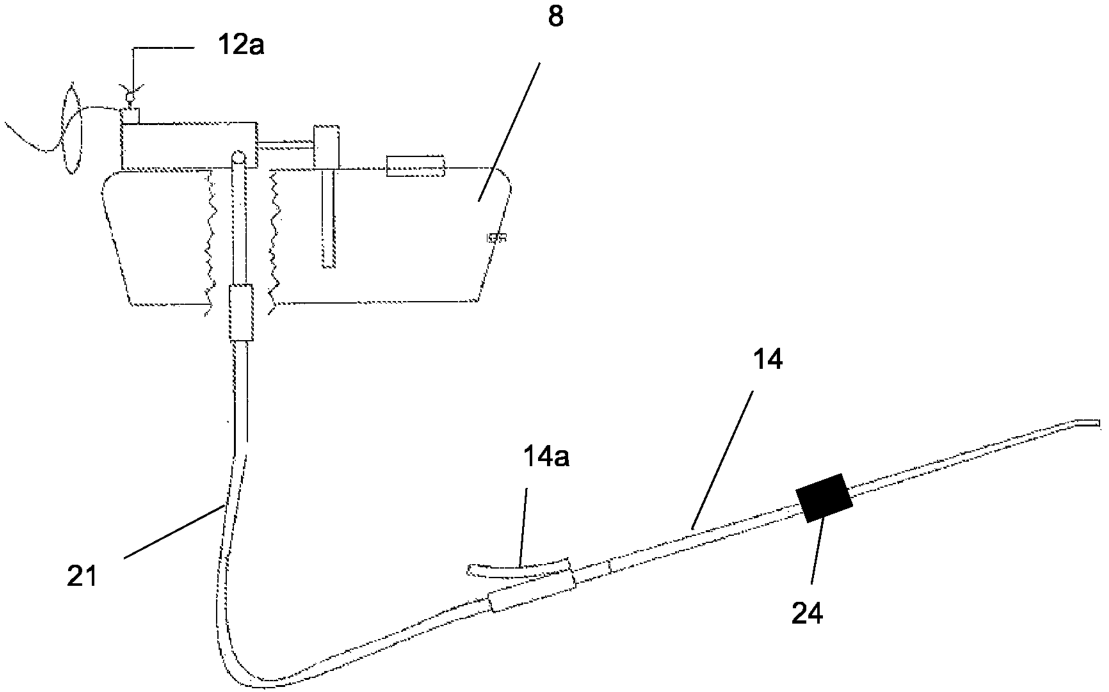
FIG. 6 spray gun component of the chemical agent application system, in accordance with the principles of the present disclosure.

As shown in FIG. 6, the spray gun or nozzle 14, includes a trigger or button 14*a* that, when pushed or activated by the operator of the mowing tractor, causes the spray gun or nozzle 14 to spray or shoot the chemical agent. The spray gun or nozzle 14, along with the spray gun hose 21, may be stored or snapped into a storage area SA on the lower area LA of the vehicle frame 2 that is adapted to receive the spray gun or nozzle 14, as shown in FIG. 7. The spray gun or nozzle 14 may also be provided with one or more magnets 24 so that it can remain fixed to the storage area SA on the lower area LA of the vehicle frame 2; or alternatively, the storage area SA may include one or more clips 23 wherein the spray gun or nozzle 14 can be snapped into so that it can remain fixedly attached thereto. It should be noted that the spray gun or nozzle 14 may be operated by hand or by stepping (by foot) on the trigger 14*a* while the spray gun or nozzle 14 is stored in the storage area SA on the lower area LA. As such, the gun or nozzle 14 can be operated by grabbing it, pulling the trigger 14*a*, and spraying or applying the chemical agent in a desired direction while driving or operating the mowing tractor 1; or by leaving it in the storage area SA on the lower area LA of the vehicle frame 2 and stepping on the trigger 14*a* while operating the lawn mowing tractor 1. Furthermore, it should be noted that the suction pump 12 is powered by the battery 15. Particularly, the battery 15 is connected, via one or more cables 19*a*, 19*b*, to the suction pump 12, thereby allowing the suction pump 12 to receive power from the battery 15, as shown in FIG. 4. Moreover, as shown in FIGS. 1 and 2, the chemical agent tank 8 includes an opening adapted to receive the chemical agent, wherein said opening is adapted to interact with a plug or cap C1 to close off access to the chemical agent tank 8. Similarly, the gas tank 9 also includes an opening adapted to receive gasoline, wherein said opening is adapted to interact with a plug or cap C2 to close off access to the gas tank 9. It should be noted that a second chemical agent tank 22 may be attached to the upper area UA on the rear end 2*b* of the vehicle frame 2, wherein said second chemical agent tank 22 is adapted to receive a second chemical agent that may be the same or different from the chemical agent stored in the first chemical agent tank 8. Like the first chemical agent tank 8, the second chemical agent tank 22 requires a suction pump, a suction hose, and spray gun in order for the operator to be able to draw the chemical agent within it, as already described for the first chemical agent tank 8. The spray gun for the second chemical agent tank 22 may be stored on the upper area UA of the vehicle frame right behind the seat 6 and attached thereto via one or more magnets or clips so that it can remain fixed to the upper area UA of the vehicle frame 2.

As shown in FIG. 1, the lawn mowing tractor 1 further comprises a speed control lever 16 and one or more tillers or joysticks 5 adapted to steer or maneuver the lawn mowing tractor 1, a blade assembly or mower cutting deck 18 secured to the bottom face 2*d* of the vehicle frame 2, the blade assembly comprising a set of cutting rotating blades disposed within a housing guard 7. It should be noted that the joysticks 5 control the one or more wheels 3*a* secured to the front end 2*a* and thus steer the mowing tractor. Alternatively, the lawn mowing tractor may include one or more steering levers 17*a*, 17*b*, adapted to direct the movement of the lawn mowing tractor 1 via differential steering. Particularly, when both steering levers 17*a*, 17*b* are pushed forward simultaneously with the same force, the mower moves forward; when both steering levers 17*a*, 17*b* are pulled back simultaneously with the same force, the mower moves backward. Push one lever 17*a* more than the other 17*b* and the mower makes a gentle turn. Push one lever 17*a* forward and pull the other 17*b* back and the mower pivots from the drive wheels, creating a zero-radius turn. The engine 4 drives the traction of the one or more wheels 3*a*, 3*b*, 3*c* and of the rotating blades by means of power transmission (not shown), e.g., pulleys, belts, chains, and gears, as is known in the art.

Although certain exemplary embodiments and methods have been described in some detail, for clarity of understanding and by way of example, it will be apparent from the foregoing disclosure to those skilled in the art that variations, modifications, changes, and adaptations of such embodiments and methods may be made without departing from the true spirit and scope of the claims. Therefore, the above description should not be taken as limiting the scope of the invention which is defined by the appended claims.

The invention is not limited to the precise configuration described above. While the invention has been described as having a preferred design, it is understood that many changes, modifications, variations and other uses and applications of the subject invention will, however, become apparent to those skilled in the art without materially departing from the novel teachings and advantages of this invention after considering this specification together with the accompanying drawings. Accordingly, all such changes, modifications, variations and other uses and applications which do not depart from the spirit and scope of the invention are deemed to be covered by this invention as defined in the following claims and their legal equivalents. In the claims, means plus function clauses, if any, are intended to cover the structures described herein as performing the recited function and not only structural equivalents but also equivalent structures.

All of the patents, patent applications, and publications recited herein, and in the Declaration attached hereto, if any, are hereby incorporated by reference as if set forth in their entirety herein. All, or substantially all, the components disclosed in such patents may be used in the embodiments of the present invention, as well as equivalents thereof. The details in the patents, patent applications, and publications incorporated by reference herein may be considered to be incorporable at applicant's option, into the claims during prosecution as further limitations in the claims to patently distinguish any amended claims from any applied prior art.

What is claimed is:

1. A chemical agent application system that is removably attachable to a lawn mowing tractor, comprising:

a chemical agent tank having a bottom panel, a first sidewall, a second sidewall, a slanted front panel, a slanted rear panel, and a top panel interconnected to define an interior volume secured to and dimensioned and shaped to fit in a footrest section of a lawn mowing tractor;

a suction pump, a suction hose, and a spray gun comprising a trigger;

wherein the suction pump is attached to the first chemical agent tank and is adapted to draw a chemical agent from the chemical agent tank, via the suction hose, and to direct the chemical agent towards the spray gun;

wherein the lawn mowing tractor comprises a vehicle frame having an upper area and a lower area;

wherein the upper area has a higher elevation on the vehicle frame than the lower area; and wherein the footrest section is located on the lower area;

the lower area including a first slanted wall and a second slanted wall opposite each other that define the footrest section on the vehicle frame, wherein the slanted front panel conforms to the second slanted wall and the slanted rear panel conforms to the first slanted wall, and wherein the bottom panel is parallel to the footrest section such that the chemical agent tank conforms to the specific geometry of the footrest section.

2. The chemical agent application system of claim 1, wherein the lawn mowing tractor is a zero-turn lawn mower.

3. The chemical agent application system of claim 1, wherein the chemical agent is a fertilizer, or a bactericide, or a pesticide, or an herbicide, or a fungicide, or an insecticide, or a fumigation substance, or a lawn maintenance chemical substance, or any combination thereof.

4. The chemical agent application system of claim 1, further comprising a storage area on the lower area of the vehicle frame that is adapted to receive or store the spray gun.

5. The chemical agent application system of claim 1, wherein the spray gun comprises one or more magnets adapted to fix the spray gun to the lower area of the vehicle frame.

6. The chemical agent application system of claim 1, wherein the lower area comprises one or more clips adapted to fix the spray gun thereto.

7. The chemical agent application system of claim 1, wherein the trigger is capable of being activated by a foot stepping on it while the spray gun is secured to the lower area.

8. The system of claim 1, wherein the chemical agent tank comprises one or more channels on the top panel configured to receive and guide a strap used to secure the tank to the lower area of the vehicle frame.

9. The system of claim 8, wherein the tank is secured by an elastic belt or ratchet strap extending through the channels to tie the tank to the lower area.

10. The system of claim 1, wherein the tank sidewalls include one or more openings aligned with corresponding openings in the lower area of the vehicle frame to receive fasteners securing the tank.

11. The system of claim 1, wherein the suction pump is electrically powered by a battery, the pump being connected to the battery through one or more electrical cables.

12. The system of claim 1, further comprising a second chemical agent tank attached to the upper area at the rear end of the vehicle frame.

13. The system of claim 1, wherein a spray gun hose couples the spray gun to an attachment area on the suction pump.

14. The system of claim 13, further comprising a second spray gun for the second chemical agent tank and a storage location behind the seat adapted to receive the second spray gun.

* * * * *